Jan. 15, 1924.

L. L. EVANS 1,480,752

ELECTRIC WELDING MACHINE

Filed Aug. 28, 1922

Inventor

Lloyd L. Evans

Patented Jan. 15, 1924.

1,480,752

UNITED STATES PATENT OFFICE.

LLOYD L. EVANS, OF CLEVELAND, OHIO, ASSIGNOR TO THE AMERICAN WELDING & MFG. COMPANY, OF WARREN, OHIO, A CORPORATION OF OHIO.

ELECTRIC WELDING MACHINE.

Application filed August 28, 1922. Serial No. 584,886.

*To all whom it may concern:*

Be it known that I, LLOYD L. EVANS, a citizen of the United States, residing at Cleveland, in the county of Cuyahoga and State of Ohio, have invented a certain new and useful Improvement in Electric Welding Machines, of which the following is a full, clear, and exact description, reference being had to the accompanying drawings.

This invention relates to a sliding contact for the movable terminal of an electric welder.

The principal object of the invention is to provide a simple and efficient means for maintaining an electrical connection of low resistance between the stationary and sliding parts of the terminal. More specifically it is the purpose of the invention to maintain the electrical connection by means of independently mounted wedge blocks which fit between oppositely inclined opposing faces of the sliding and stationary parts, and which are yieldingly pressed inwardly into full contact with the inclined faces of both the stationary and movable parts.

A further object of the invention is to provide means for independently adjusting the wedge blocks to obtain proper alinement and the proper spring pressure upon each of the blocks to maintain full contact upon both sides of the terminal and accommodate themselves to any movement of the sliding member backward or forward on the stationary member.

Reference should be had to the accompanying drawing in which

Figure 1:
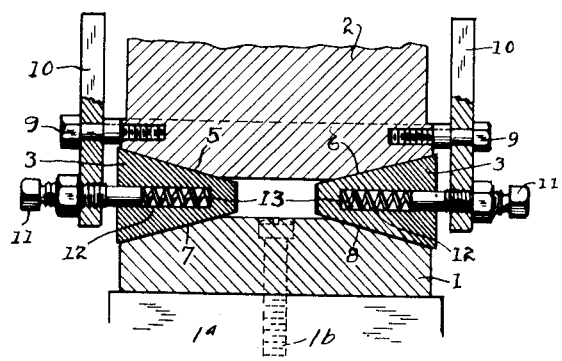
Fig. 1 is a vertical section through the movable electrode terminal.
Figure 2:
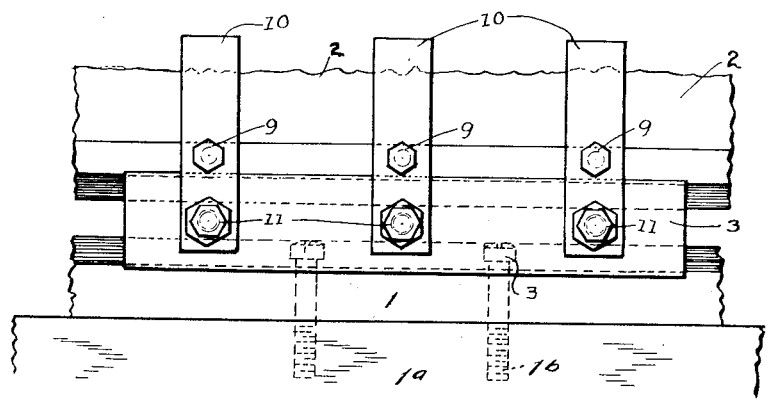
Fig. 2 is a side elevation.

Referring to the drawing, one electrode comprises a stationary base member 1 suitably secured as by bolts 1ᵇ to the member 1ᵃ which may be a part of the transformer, a sliding work carrying member 2, and intermediate wedge blocks 3. The wedge blocks 3 fit between the lower faces 5 and 6 of the upper member 2 and upper faces 7 and 8 of the lower member 1. The faces of the wedge blocks are shaped correspondingly to the shape of the faces of the upper and lower members. Either or both pairs of the faces 5, 6 and 7, 8 may be oppositely inclined. As shown in the drawing, the inclined faces 5, 7, 6, and 8 between which the wedges 3 fit are inclined at a relatively sharp angle with respect to each other whereby wide bearing surfaces are provided between the wedge blocks 3 and the members 1 and 2. The wedge blocks 3 as shown in Fig. 1 are secured to the movable slide member 2, thereby having longitudinal movement relative to the stationary member 1 and yielding transverse movement relative to both members to insure and maintain a good contact between the bearing surfaces at all times when the member 2 is moved backward or forward. The bolts 9 are threaded into recesses in the member 2 and carry posts 10, which are spaced from the member 2. The slide blocks 3 each have a socket 12 extending inwardly from the outside and in these sockets are mounted coil springs 13. Bearing upon the outer ends of the springs 13 are the adjustable screws 11 which pass through a threaded bushing carried by side post 10. By adjusting the screws 11 the springs 13 can be compressed to force the blocks inwardly with any desired pressure and into close engagement with the inclined bearing faces 5 and 6.

Figure 3:
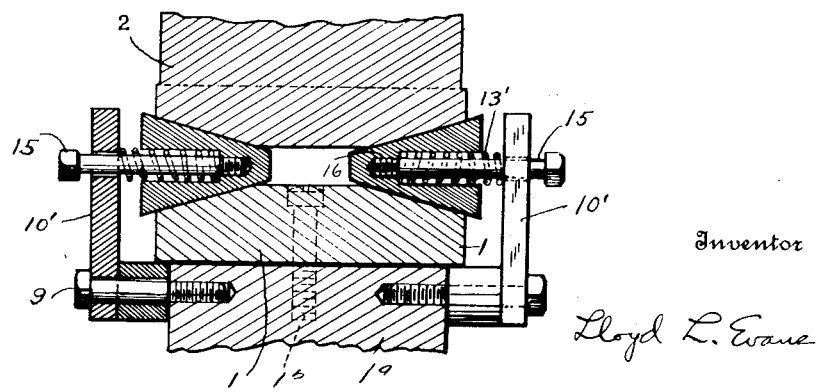
Fig. 3 is a vertical section showing a modified form.

The modification shown in Fig. 3 shows the post 10' bolted to the base member 1 and suitably spaced therefrom. Bolts 15 are preferably loosely held in the post 10' and threaded into recesses 16 in the blocks 3'. The recesses 16 are enlarged to form seats for compression springs 13' which bear against these seats and the faces of the posts 10', respectively. The pressure upon each of the blocks can be adjusted independently so that the individual blocks may be adjusted to compensate for wear and may be held at all times under the compression necessary to insure proper contact on both sides of the terminal members, and to permit the lateral movement necessary to compensate for movements of the slide member toward or from the fixed member.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:—

1. A sliding contact block for electric welding machines including a stationary base member, an upper slidable member, said members having opposed oppositely inclined faces, wedge blocks fitting between the opposed faces of said members, means for connecting said wedges with one of said members whereby longitudinal movement of said wedges with respect to one of said members is prevented.

2. A sliding contact for electric welding machines comprising a stationary base member, an upper slidable member, said members having opposed oppositely inclined faces, wedge blocks fitting between the opposed faces, means for yieldingly forcing said wedge blocks toward each other and means for connecting said wedge blocks to said upper members whereby said wedge blocks have a longitudinal movement when said upper member moves.

3. A sliding contact for electric welding machines comprising a stationary base member, an upper slidable member, said members having opposed oppositely inclined faces, side members engaging the opposed faces of said upper and lower members, means for pressing said side members toward each other, and means for independently adjusting said pressing means.

4. A sliding contact for electric welding machines comprising a stationary base member, an upper slidable member, one of said members having oppositely inclined faces, side members engaging said faces, means for pressing said side members together, means for independently adjusting said pressing means, and means for connecting said side members to one of said first named members.

5. A sliding contact for electric welding machines comprising a stationary base member, an upper slidable member, one of said members having oppositely inclined faces, side members engaging said faces, means for fastening said side members to one of said first named members and means to independently adjust said side members toward or from each other.

6. A sliding contact for electric welding machines comprising a stationary base member, an upper slidable member, said members having opposed oppositely inclined faces, side members engaging said opposed faces, and means for independently adjusting said side members toward or away from each other.

7. A sliding contact for electric welding machines comprising a stationary base member, an upper slidable member, said members having opposed oppositely inclined faces, side members engaging the opposed faces of said upper and lower members, spring means for yieldingly forcing said side members toward each other, means for securing said side members to said stationary member, and means for independently adjusting said spring means.

8. A sliding contact for electric welding machines comprising a stationary base member, an upper slidable member, wedge means engageable between said members, means for independently and adjustably pressing said wedge means inwardly to insure a full electrical contact between said stationary and slidable members and means securing said adjustable means to one of said first named members.

9. A sliding contact for electric welder terminals, comprising a stationary base member, an upper slidable member, said members having opposed oppositely inclined faces, wedge blocks fitting between the opposed faces of said members, independent means to force said blocks toward each other, and means for independently adjusting the pressure of said forcing means.

10. A sliding contact for electric welder terminals, comprising a stationary base member, an upper slidable member, said members having opposed oppositely inclined faces, wedge blocks fitting between the opposed faces of said members, means for holding said wedges against longitudinal movement with respect to one of said members, compression springs interposed between said holding means and wedges, and means for independently adjusting the compression of said springs.

11. A sliding contact for electric welding machines comprising a stationary base member having its top surface formed with oppositely inclined faces, an upper slidable member, wedge means engageable between said members, said means having oppositely inclined lower faces to engage the faces of said stationary member, spring means for yieldingly forcing said wedge members toward each other and means for securing said wedge members to said stationary member to prevent longitudinal movement of the wedge members.

12. A sliding contact for electric welder terminals comprising a stationary base having its top surface formed with oppositely inclined faces, a sliding member having its bottom surface formed with oppositely inclined faces, wedge blocks fitting between said opposed faces, said blocks having spring receiving sockets extending inwardly from their outer edges, compression springs in said sockets, supports adjacent the outer edges of said wedges and screws carried by said supports, said screws having their inner ends adjustably movable in said sockets and means for adjusting the pressure of said compression springs.

In testimony whereof, I hereunto affix my signature.

LLOYD L. EVANS.